UNITED STATES PATENT OFFICE.

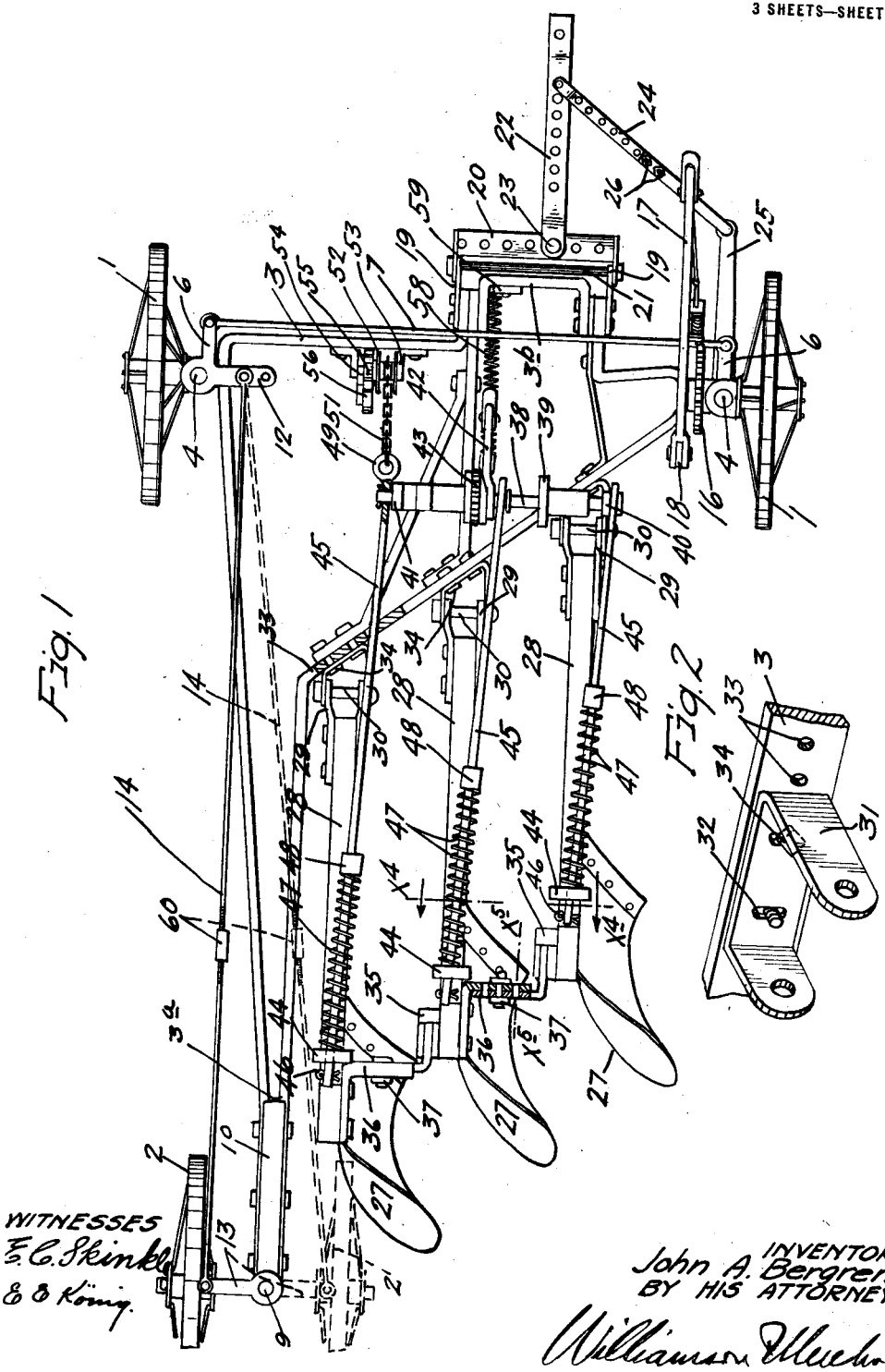

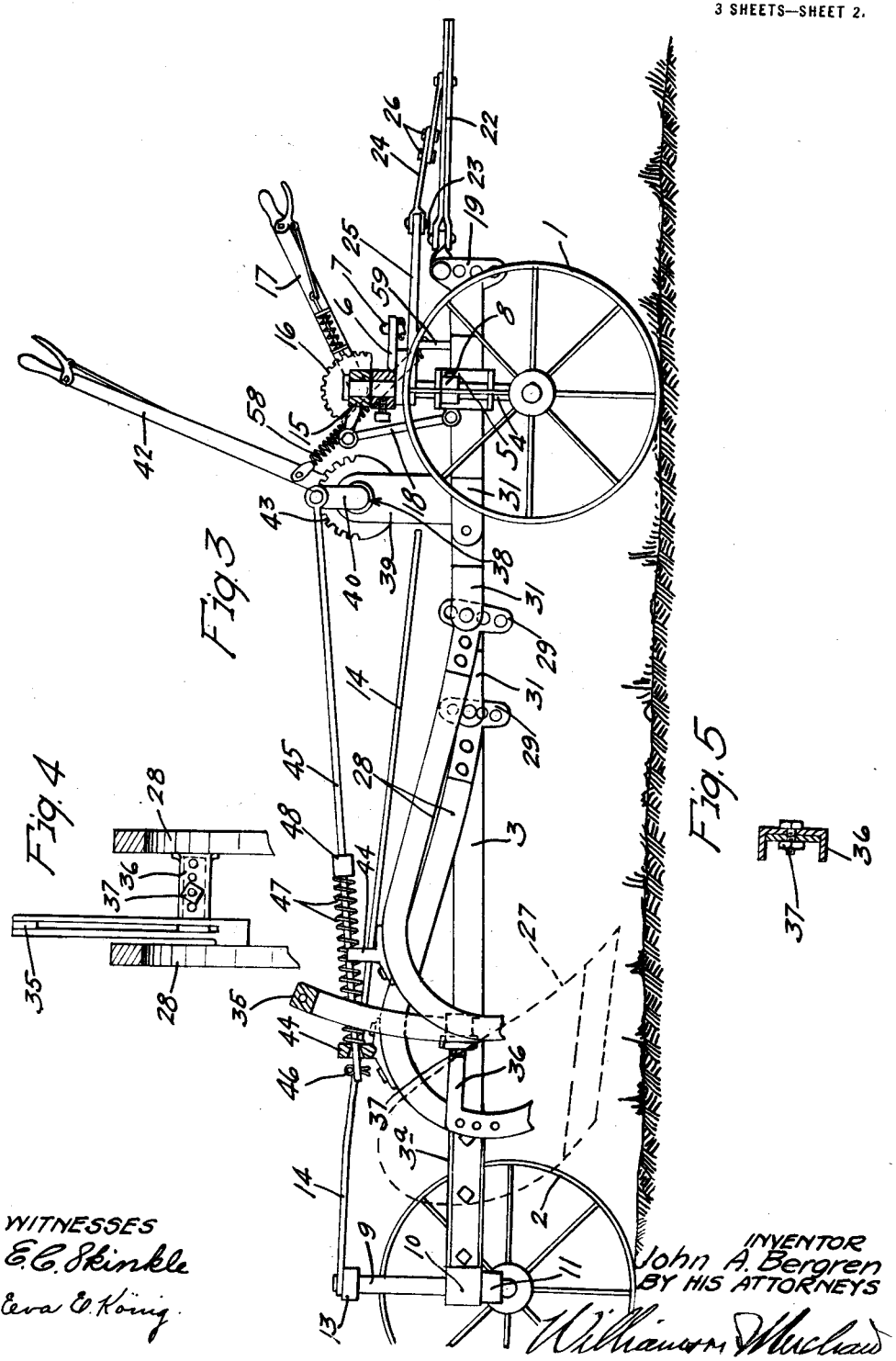

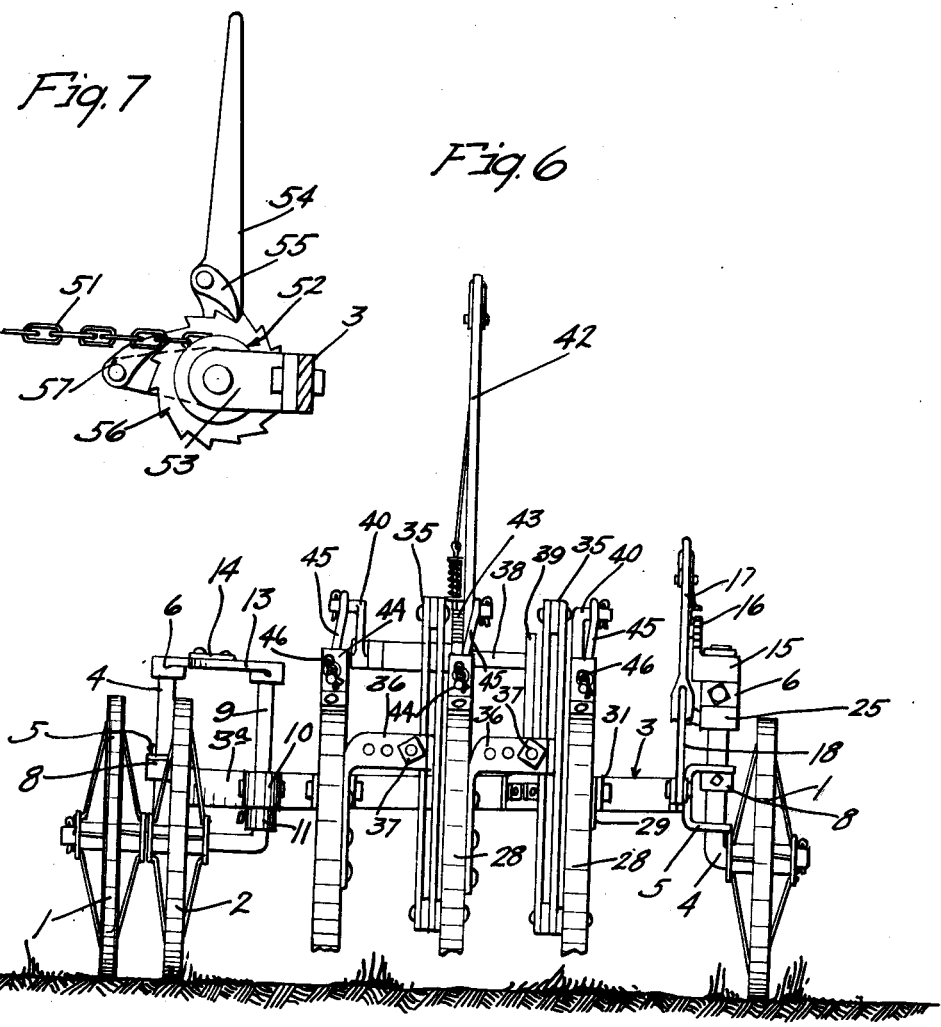

JOHN A. BERGREN, OF LAKE PARK, MINNESOTA, ASSIGNOR OF ONE-TWENTIETH TO AUGUST HOLMGREN, THREE-TWENTIETHS TO JOHN H. MOAN, THREE-TWENTIETHS TO CHARLES H. KELSON, ONE-TWENTIETH TO CARL T. STRAND, AND TWO-TWENTIETHS TO ALFRED F. YOUNGBERG, ALL OF LAKE PARK, MINNESOTA.

GANG-PLOW.

1,214,002.   Specification of Letters Patent.   Patented Jan. 30, 1917.

Application filed June 28, 1915. Serial No. 36,697.

*To all whom it may concern:*

Be it known that I, JOHN A. BERGREN, a citizen of the United States, residing at Lake Park, in the county of Becker and State of Minnesota, have invented certain new and useful Improvements in Gang-Plows; and I do hereby declare the following to be a full, clear, and exact description of the invention, such as will enable others skilled in the art to which it appertains to make and use the same.

My invention has for its object to provide a simple and highly efficient gang plow adapted to be drawn either by horses or by a tractor, but especially adapted for use in connection with small tractors capable of operating two or three plows.

Generally stated, the invention consists of the novel devices and combinations of devices hereinafter described and defined in the claims.

In the accompanying drawings which illustrate the invention, like characters indicate like parts throughout the several views.

Referring to the drawings: Figure 1 is a plan view showing the improved gang plow; Fig. 2 is a detail perspective view showing one of the plow beam coupling yokes and a portion of the plow frame; Fig. 3 is a side elevation of the improved gang plow, some parts being broken away, and some parts being sectioned; Fig. 4 is a detail in section taken approximately on the line $x^4$ $x^4$ on Fig. 1; Fig. 5 is a detail in section on the line $x^5$ $x^5$ on Fig. 1; Fig. 6 is a rear elevation of the gang plow; and Fig. 7 is a detail view.

The truck of the improved plow is provided with three wheels, to-wit, two front wheels 1, and a rear wheel 2. The plow frame, which is indicated as an entirety by the numeral 3, is preferably made from commercial rolled steel or iron bars, either plain, channeled or other form, put together to form an approximately triangular skeleton structure with a rearwardly extended portion 3ª on the land side. The front wheels 1 are journaled on outwardly bent trunnions of wheel posts 4 mounted for horizontal oscillatory movements in bearing brackets 5 rigidly secured to the sides of the front end portion of the frame 3. The furrow or inside post 4 is longer than the land or outside post and is free for vertical, as well as oscillatory movements in its bearing bracket 5. Forwardly projected arms 6 are secured to the upper ends of the two wheel posts 4 and these arms are connected by a cross-connected rod or link 7 which keeps the two front wheels parallel. A stop collar 8 on the outside post 4 engages the upper prong of the outer bracket 5 and limits the downward movement of the frame at that point.

The rear wheel 2 is journaled on the outwardly bent trunnion of an upright wheel post 9 that is journaled in a bearing bracket 10 rigidly secured to the projection 3ª of the frame 3. A collar 11 adjustably secured on the post 9 bears against the lower face of the bracket 10 and limits the downward movement of the rear portion of the frame. By this means the rear portion of the said frame 3 is made vertically adjustable. The upper end of the land or outside wheel post 4 is provided with an inwardly projected arm 12 and the upper end of the rear wheel post 9 is provided with an outwardly projecting arm 13, and the ends of these arms 12 and 13 are connected by an oblique connecting rod or link 14 which keeps the front and rear land side wheels 1 and 2 parallel or as nearly so as desired. As shown, the front end of the rod 14 is adjustably pivoted to the arm 12 so that the rear wheel 2 may be set at a slight angle in respect to the land side front wheel, when desired. This is sometimes desirable to set the rear wheel so that it will crowd against the lateral thrust produced by the plows.

The relatively long inner or furrow side wheel post 4 has a hub 15 swiveled on its upper end, and this hub has a rigidly secured lock segment 16.

The numeral 17 indicates a latch lever that is intermediately pivoted to an inwardly projected trunnion on the hub 15 and the short rearwardly projected end of this lever is connected by a link 18 to a lug on the furrow or inside bearing bracket 5. By adjustments of the lever 16, the front furrow side of the plow frame may be vertically adjusted and set at different elevations in respect to the ground. The so-called swiveled hub 15 is held against oscillation to a considerable extent by the link 18, but the purpose of the swiveled connection is to permit the supporting post 4 to oscillate with the front furrow side wheel.

The transverse front bar of the frame 3 has an approximately U-shaped forward projection 3ᵇ to which laterally spaced clevis-like coupling plates 19 are rigidly secured.

The numeral 20 indicates a perforated coupling bar having rearwardly projected end lugs adjustably secured to the clevis plates 19 by a coupling bolt 21.

The numeral 22 indicates a draw bar, the rear end of which is adjustably pivoted to the coupling bar 20 by a bolt or pin 23.

The numeral 24 indicates a connecting link pivotally connected at one end to the draw bar 22 and pivotally connected at its other end to an arm 25 rigidly secured to and projecting forward from the inside wheel post 4 to a point just below the relatively short arm 6 thereof. The pivotal connection between the inner end of the link 24 and the draw bar 22 is made adjustable by a plurality of longitudinally spaced holes in the latter; and the said link comprises overlapped sections made longitudinally adjustable by a plurality of holes in the said sections and coupling bolts 26 passed therethrough.

The numeral 27 indicates the plows having the usual plow beam 28, to the front ends of which clevis plates 29 are rigidly secured. The said clevis plates 29 have vertically spaced perforations through which coupling bolts 30 are passed to couple the same to the perforated prongs of the clevis yokes or brackets 31. These yokes 31 are adjustably connected to the oblique bar of the frame 3, preferably with freedom for both vertical and lateral adjustments. To this end, the yokes 31 are provided with vertical slots 32 and the said oblique bar is provided with transversely spaced perforations 33, and nut-equipped bolts 34 are passed through the said perforations and slots.

As an important feature of this invention, I provide means for positively spacing the plows while permitting of independent vertical movements thereof. To accomplish this, laterally spaced upright guide bars 35 are rigidly secured to the rear portions of the plow beams 28 of the inner and intermediate plows and guide arms 36 are rigidly secured to the rear portions of the intermediate and land side or outer plow. These guide arms 36 are preferably made approximately Z-shaped, each arm being made up of two sections having overlapping perforated portions adjustably, but rigidly connected by nut-equipped bolts 37. The outer end portions of the said guide arms are rigidly secured to the plow beams of the intermediate and outside plow while the forwardly extended inner ends of the said guide arms work with freedom for vertical movement between the guide bars 35 of the intermediate and inside plow beam.

The laterally spaced guide bars 35 form bifurcated guide segments that extend on the arc of a curve having its center at, or approximately at the pivotal connection between the plow beams and the frame. Furthermore, it is highly important to note that these guide segments are entirely outward of the space that is below, or within the line followed by the under and inner curved rear edges of the plow beam to which it is attached. This leaves the inner and under surface of the plow beam absolutely clear and it also leaves the entire space on both sides of the said line free from projections which would catch corn stalks, and the like, in the plowing action. It also makes feasible, the use of very short horizontally projected guide arms which are also outside of the space above noted, so that they will not catch corn stalks, and the like, in the plowing action. These short guide arms 36 do not work endwise through the guide segments 35, but simply move upward and downward therein without varying their projection through the same.

As a means for raising and lowering the plows, I provide a transverse rock shaft 38 mounted in upright bearings 39 rigidly secured on the frame 3. At its ends, this rock shaft 38 has upwardly extended bearing arms 40 and 41, and at its intermediate portion, it is provided with an upwardly extended latch lever 42 that coöperates with a latch arch 43 rigidly secured to one of the upright shaft bearings 39.

The rear portion of each plow beam 28 is provided with an upwardly projected arm or lug 44 having a perforation through which the rear end of a lifting rod 45 is passed. Cotters or other form of stop devices 46 are applied in the extreme rear ends of the lifting rods 45 and engage with the lugs 44 to cause the said rods to raise the plows when pulled forward. The front ends of the lifting rods 45 are connected, one to the arm 40, the other to the arm 41 and the third, or intermediate, to the lever 42 at a point in line with the pivotal connections between the outside rods and the said arms 40 and 41. The inside lever 42 is therefore made to serve as one of the crank arms for connecting the lifting rod to the rock shaft 38.

Coiled springs 47 are placed around the rear portions of the lifting rods 45 and are compressed between the respective lugs 44 and stop collars 48 on the said rods. These springs yieldingly press the plows downward but permit them independently to rise, in case they strike a rock or other obstruction.

The land side lifting rod 45 is detachably connected to its crank arm 41 and is provided with a forwardly projecting eye 49 to which one end of a chain 51 is secured. The other end of this chain 51 is attached and adapted to be wound upon a windlass drum 52, the shaft of which is journaled in bearing lugs 53 rigidly secured to the inner face of the transverse front bar of the frame 3. The windlass drum 52 is rotated by a hand lever 54, connected thereto, by a pawl 55 and a ratchet wheel 56. This lever 54 is fulcrumed on the journal of the windlass drum 52 and carries the pawl 55, and the ratchet wheel 56 is rigidly secured to the windlass drum 52. A gravity actuated pawl 57 is pivoted to one of the bearing lugs 53 and arranged for coöperation with the ratchet wheel 56, to prevent backward rotation of the windlass drum 52, and hence, the unwinding of the chain 51, under the weight of the land side plow 27.

To make the lifting of the plows an easier matter, under manipulation of the lever 42, they are, in part, counterbalanced or lifted by a strong coiled spring 58. This spring, as shown, is anchored at one end to the said lever, and at its other end to a projection 59 on the front bar of the main frame 3.

As is evident, by manipulation of the lever 42, the plows may be lowered and raised to and from operative positions, and may be raised into inoperative position above the ground or may be set in inoperative position above the ground. When set in operative position in the ground, they are yieldingly pressed downward by the springs 47, so that they may rise and clear rocks or other obstructions. The depth at which they will plow will depend on the elevation of the front ends of the plow beams. When running on level ground with the plows raised, the furrow side of the main frame will be dropped in respect to the inside or furrow wheel, but when plowing, the said furrow wheel will run in a furrow, and hence, the furrow side of the main frame will be raised, or in other words, the said furrow wheel will be thrown downward by manipulation of the lever 17, so that the main frame will be maintained in a level position.

It is sometimes desirable to use plows of different width. For example, breaking plows are usually narrower than other plows. For this reason, means above described have been provided for varying the spacing of the plows.

Obviously, when the spacing of the front ends of the plow beams is varied by adjustments of the clevis brackets 31 on the oblique bar of the main frame 3, the spacings of the plow should be correspondingly varied by adjustments of the two-part spacing arms 36.

A smaller tractor, such as will preferably be used in connection with this gang plow, will be found to have sufficient power to draw three plows under certain conditions of the soil, but may not be powerful enough to draw more than two plows under certain other conditions of the soil. For this reason, it is advisable to provide a simple and efficient means for holding one of the plows out of action when desired. The above described lever acuated windlass drum 52 on the frame 3, with its chain connection 51 to the eye 49 on the lifting rod 45, affords very simple means for accomplishing this result.

Obviously, by detaching the lifting rod 45 from the crank arm 41 and operating the lever 54 with a ratchet like action, the land side plow may be raised and held in its inoperative position while the other two plows may be manipulated just as if all of the plows were operative. It is also evident that said plow may be lowered by reversing the action of the lever 54. Here it will be noted that the vertical space between the spacing bars 35 of the intermediate plow is extended in a vertical direction far enough to permit the above noted independent movements of the plows.

When two plows instead of three are employed, the draw bar 22 should be adjusted laterally so as to properly set the line of draft. Also, different spacing of the plows may require lateral adjustments of the said draw bar in order to maintain the proper line of draft.

By reference to Figs. 1 and 6, it will be noted that the rear wheel 2 is so mounted with respect to the frame extension 3ª that by detaching the rod 14, it can be swung from a position outside of the frame, into a position inside of said frame, so as to run in the furrow formed by the land side plow 27, as indicated by dotted lines in Fig. 1. To compensate for the difference in the operative length of the rod 14 in its full and dotted line positions, as shown in Fig. 1, the same is made in two sections and connected by a turn buckle 60.

It will of course, be understood that the novel features above described may be applied to a gang plow having more or less than three plows and that said features are important, regardless of whether the plow is to be drawn by tractor or by animal power.

What I claim is:—

1. In a gang plow, the combination with a plow frame, of a plurality of plows having beams pivotally attached to said frame, guide segments secured to the rear portions of the beams of certain of said plows and extending approximately on the arc of a curve having its center at the pivotal connection between said beam and frame, and horizontal guide arms on certain of the plow beams engaging coöperating guide segments and working vertically therein, thereby holding said plows definitely spaced but free for independent vertical movements.

2. In a gang plow, the combination with a plow frame, of a plurality of plows having beams pivotally attached to said frame, guide segments secured to the rear portions of the beams of certain of said plows and extending approximately on the arc of a curve having its center at the pivotal connection between said beam and frame, and horizontal guide arms on certain of the plow beams engaging coöperating guide segments and working vertically therein, thereby holding said plows definitely spaced but free for independent vertical movements, the rear portions of said plow beams being downwardly curved, and the said guide segments being above and at the rear of the inner edge of the curved rear portion of said plow beam.

3. In a gang plow, the combination with a plow frame, of a plurality of plows having beams pivotally attached to said frame, guide segments secured to the rear portions of the beams of certain of said plows and extending approximately on the arc of a curve having its center at the pivotal connection between said beam and frame, and horizontal guide arms on certain of the plow beams engaging coöperating guide segments and working vertically therein, thereby holding said plows definitely spaced but free for independent vertical movements, the said horizontal guide arms being horizontally adjustable transversely of the plow beams, to vary the spacing between the plows.

In testimony whereof I affix my signature in presence of two witnesses.

JOHN A. BERGREN.

Witnesses:
H. M. DAHL,
MEDE OLSUN.

Copies of this patent may be obtained for five cents each, by addressing the "Commissioner of Patents, Washington, D. C."